May 6, 1958
W. F. ALLER ET AL
2,833,047
GAGING APPARATUS
Filed May 16, 1956
5 Sheets-Sheet 1
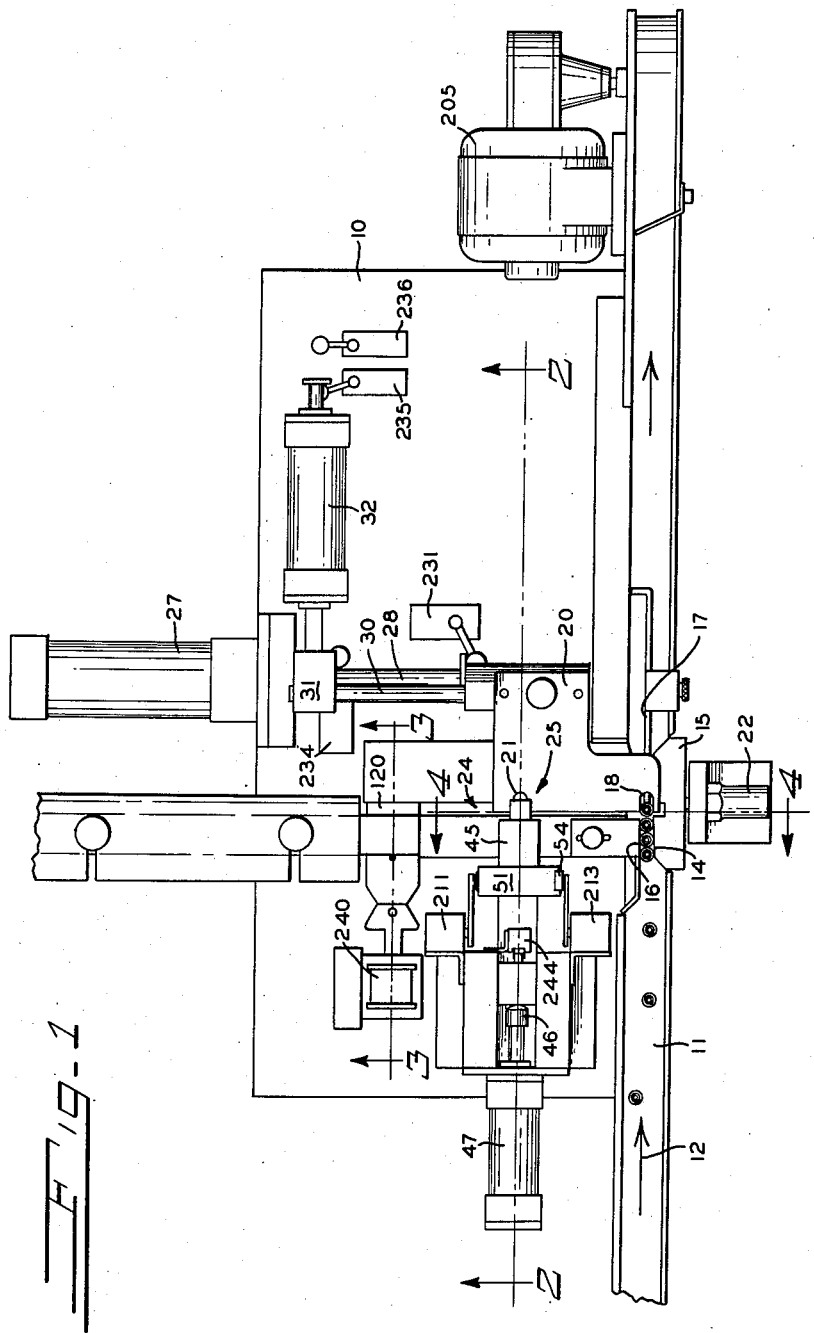
INVENTORS
Willis Jay Aller
Robert A. Eisken
BY Edward J. Noe Jr.
Atty.

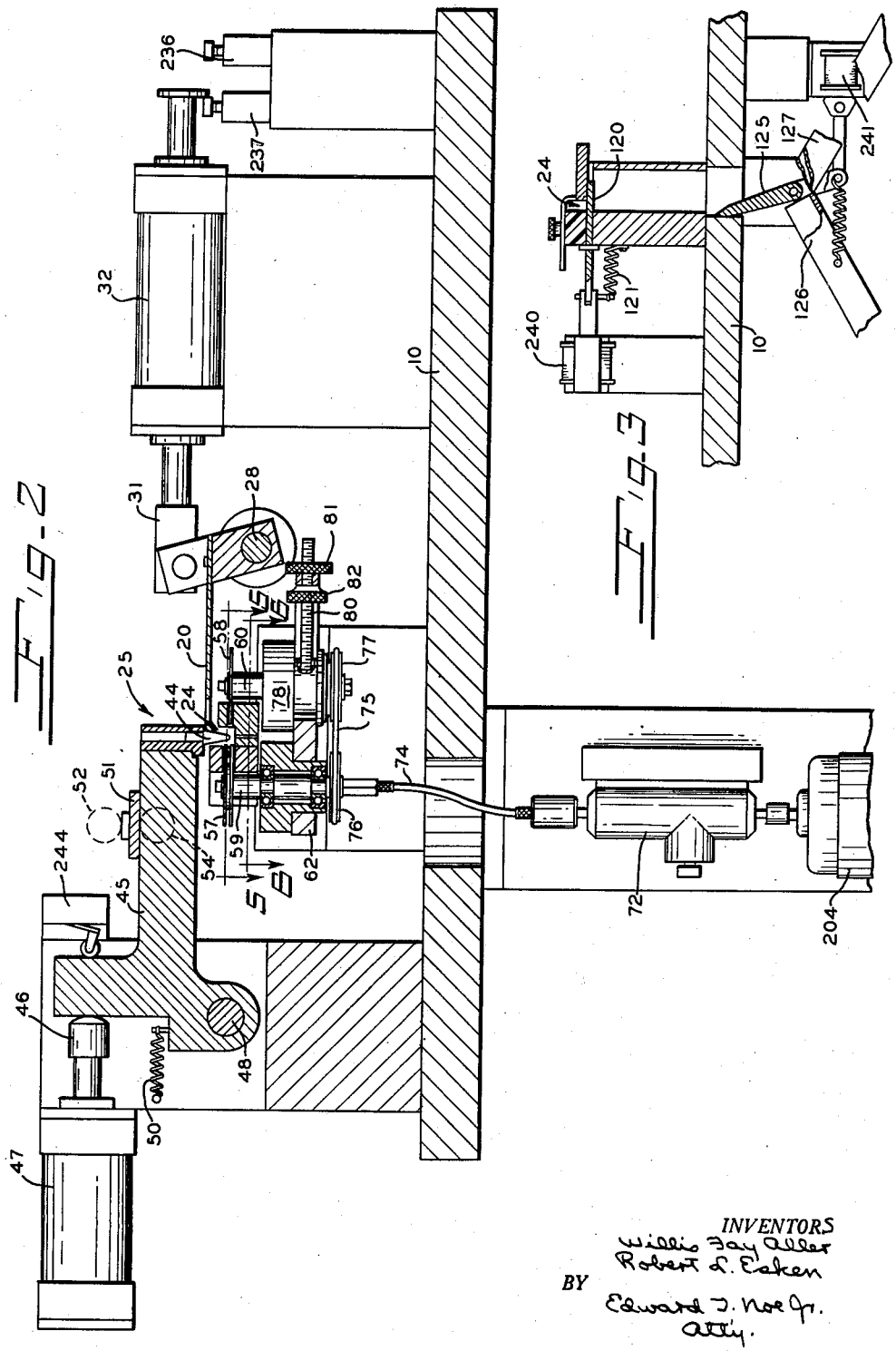

May 6, 1958   W. F. ALLER ET AL   2,833,047
GAGING APPARATUS
Filed May 16, 1956   5 Sheets-Sheet 3
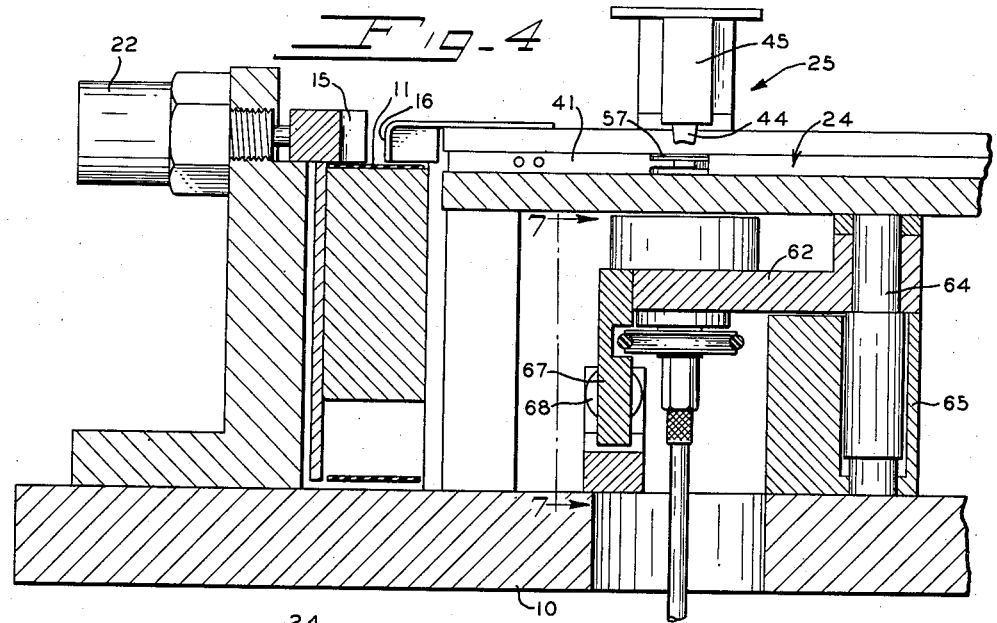
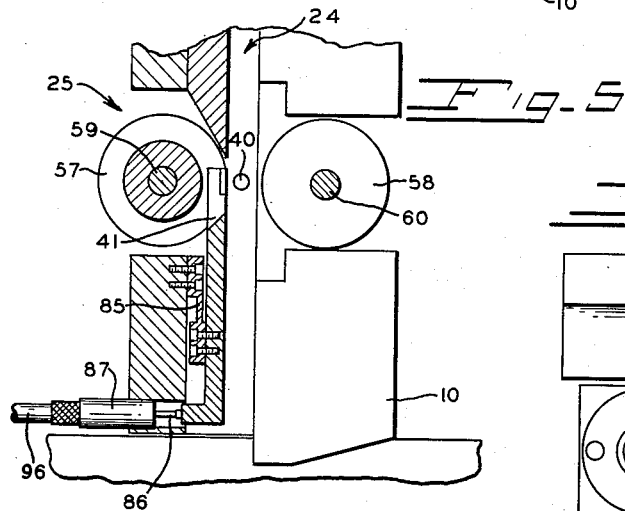
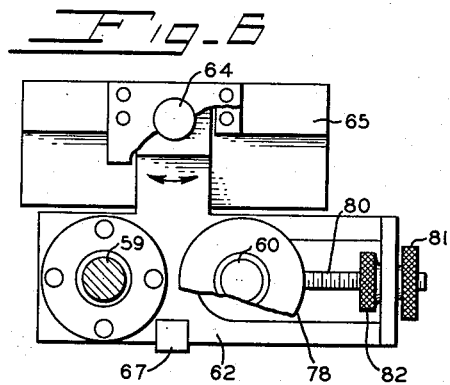
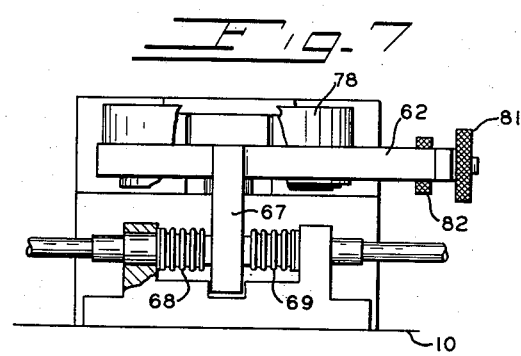
INVENTORS
Willis Fay Aller
Robert L. Esken
BY Edward J. Noe Jr.
Atty.

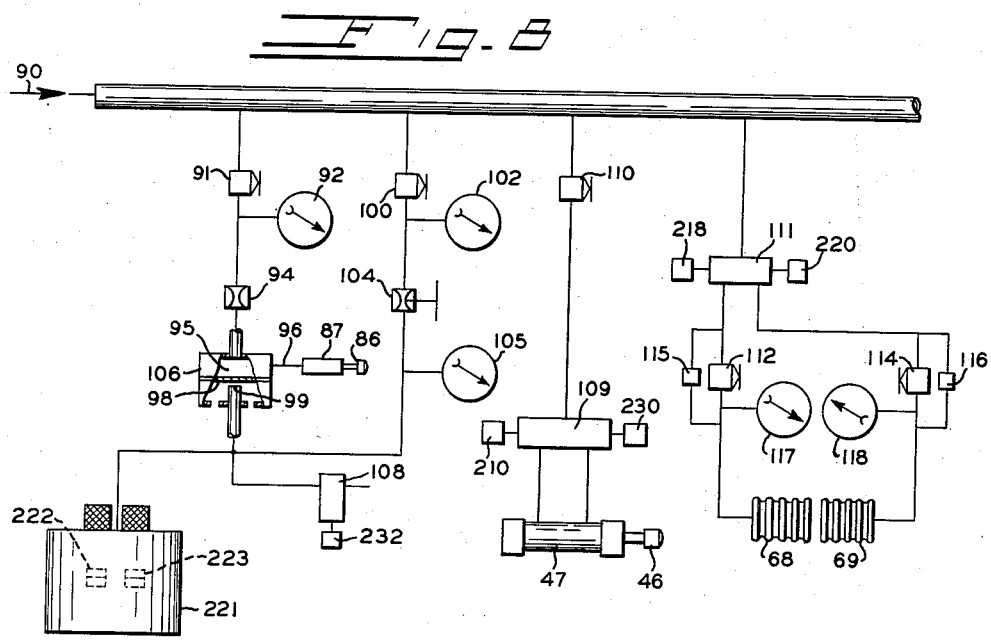
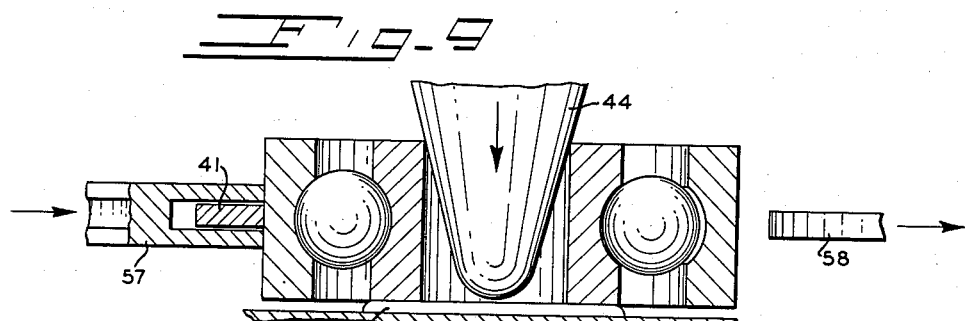
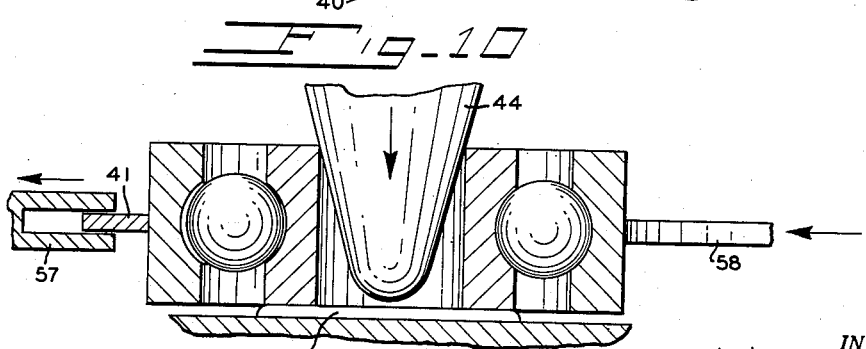

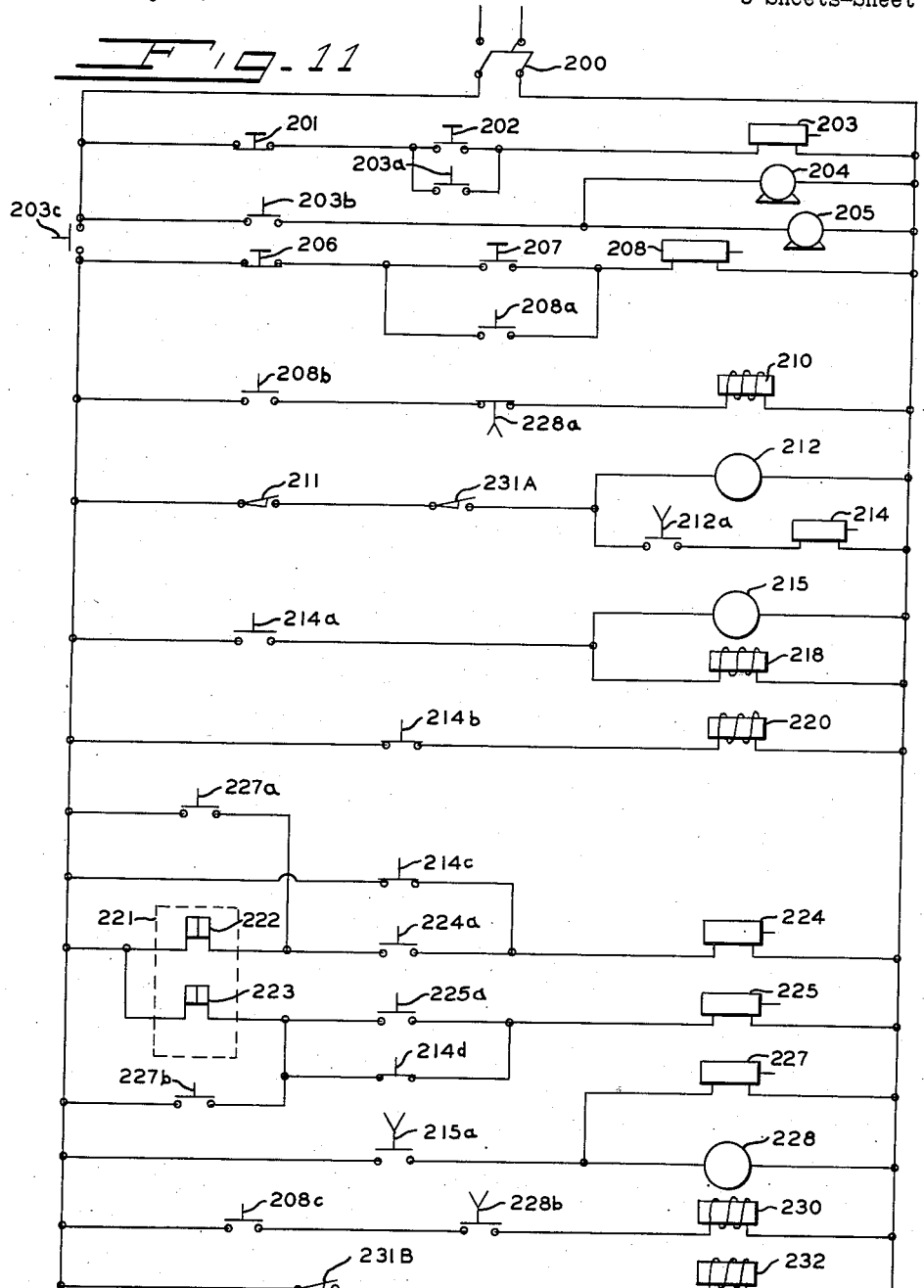

United States Patent Office 2,833,047
Patented May 6, 1958

2,833,047

GAGING APPARATUS

Willis Fay Aller and Robert L. Esken, Dayton, Ohio, assignors, by mesne assignments, to The Sheffield Corporation, a corporation of Delaware Application May 16, 1956, Serial No. 585,276

15 Claims. (Cl. 33—174)

This invention relates to gaging apparatuses.

It is an object of this invention to provide an apparatus for measuring relative play between components of an assembly such as a ball bearing in a rapid manner, with precision, and under simulated operating conditions.

It is a further object to provide such an apparatus for gaging radial play in a ball bearing assembly as the inner and outer races are relatively rotated.

It is a further object to provide an apparatus for such purposes wherein one component is held against rotation during gaging, rotation and force applying means being provided for application to another component of the assembly to simultaneously relatively rotate the components and apply reverse forces therebetween as the relative play is being gaged.

It is a further object to provide an apparatus for gaging radial play of an antifriction bearing assembly in which driven force applying means such as wheels are selectively applied to move an outer race relative to an inner and simultaneously relatively rotate the races as the radial play is being gaged, the apparatus being simple in construction and operation, having provision for precise adjustment of the applied force, and features for universal application to different types and sizes of bearings.

Other objects and advantages of this invention will be apparent from the following description, the appended claims, and the accompanying drawings, in which, Figure 1 is a plan view of an apparatus embodying the present invention, Figures 2, 3 and 4 are sectional views on lines 2—2, 3—3, and 4—4, respectively, of Figure 1, Figures 5 and 6 are sectional views on lines 5—5 and 6—6 respectively of Figure 2, Figure 7 is a fragmentary view taken substantially along line 7—7 of Figure 4, Figure 8 is a diagram of the air circuit utilized in the particular apparatus illustrated, Figures 9 and 10 illustrate the basic operation of the apparatus, Figure 11 is an electrical diagram of a portion of the electrical circuit involved in the apparatus operation, and Figure 12 is a chart of the operation of gaging switch contacts in the circuit of Figure 11.

By way of exemplification the invention has been illustrated herein as embodied in an apparatus for gaging the relative movement between components of a bearing assembly as the components are relatively driven to simulate operating conditions. Thus realistic gaging results are obtained which are accurate and truly representative of bearing performance.

It will be understood by those skilled in the art, however, that the invention can be adapted to a large variety of other apparatuses and has use in other and materially different applications. Accordingly, even though one particular embodiment of the invention has been shown and described in some detail, there is no intention to thereby limit the invention to such embodiment, but on the other hand it is intended to cover all modifications and alternative constructions falling within the spirit and scope of the invention as expressed in the appended claims.

The invention has particular application to the gaging of radial play in ball bearing assemblies and has been so illustrated. Radial play in such assemblies is extremely important as a factor in the wear life of the bearing and the accuracy of its operation. Radial play can be broadly defined as the diametral movement of an outer bearing race under reverse applied forces as the inner is held stationary.

The exemplary illustrated apparatus automatically gages radial play of ball bearing assemblies in an extremely rapid manner. The assembled bearings are automatically transferred to a gaging station where the radial play is measured and are then transferred to be segregated in accordance with the gaging results. In the gaging station the inner race, in this application, is clamped against radial movement. Driven force applying means are alternatively applied to opposite sides of the outer race to rotate it relative to the inner and take up the play therebetween in reverse directions as movement of the outer race is gaged. Preferably the force applying means are rotating wheels on a common carrier and gaging is by means of a feeler engaging the peripheral surface of the outer race and controlling an air leakage orifice connected to a gaging system responsive to the variation in flow through the orifice.

Referring more particularly to the drawings, the transfer system includes a conveyer belt 11 supported on base 10 and driven in direction 12 by a reversible electric motor 205. Bearings placed on belt 11 are carried to a position between an inclined surface 14 on an escapement bar 15 and a cooperating gripping surface 16. When escapement bar 15 is retracted by air cylinder 22 a bearing is moved against one end of an adjustable stop 17 and is located laterally by feed fingers at each side of a pocket 18 in crossfeed transfer plate 20. Transfer plate 20 has a similar pocket 21 spaced along its length.

If it is desired to load the apparatus from the other end motor 205 is reversed and the positions of the stop 17 and grip 16 are shifted relative to transfer plate 20.

Bearings are crossfed from conveyer belt 11 and along chute 24 to gaging position within gaging station 25 upon forward movement of transfer plate 20 from the return position shown in Figure 1. A bearing in station 25 which has been previously gaged is simultaneously removed from the station and carried to the segregating mechanism by this same crossfeed transfer movement.

Transfer plate 20 is actuated for its transfer movement upon extension and retraction of connecting rod 28 by air cylinder 27. Switch unit 231 is actuated at the return transfer position and switch unit 234 is closed when the transfer is forward. Bar 30, connected parallel to connecting rod 28, slides within an actuating block 31 driven by air cylinder 32. Block 31 is extended to lower the feed fingers of transfer plate 20 into chute 24 upon forward transfer movement and is retracted to rock plate 20 and raise the fingers during return movement. Switch 235 is closed when the feed fingers are down and switch 236 is closed to signal their raised position.

Gaging station 25 is shown most particularly in Figures 2 and 4 to 7. When a bearing assembly is transferred into gaging position the lower face of the inner race engages a clamp button 40 projecting slightly above the floor of chute 24. A tapered clamp or wedge 44 is then moved downwardly into the bore of the inner race in opposition to button 40 to clamp the inner race against rotation and radial movement. Clamp 44 is carried at one end of a bellcrank 45 pivoted at 48 and actuated by an abutment 46 connected to a piston within air cylinder 47. Spring 50, acting between bellcrank 45 and base 10, maintains the upper bellcrank arm in firm engagement with actuating abutment 46.

A switch actuating bar 51 is fixed to bellcrank 45. When bellcrank 45 is pivoted to release clamp 44 bar 51 engages roller 52 of switch 211, closing the switch to signal the condition. Similarly when clamp 44 is in clamping position bar 51 engages roller 54 of switch 213 to close the switch. If no bearing is in gaging position clamp 44 will move further downward and a surface on bellcrank 45 will engage and actuate switch 244, signaling the absence of a bearing.

When a bearing is moved along chute 24 to a position in the gaging station a gaging feeler arm 41 engages the periphery of the outer race and the bearing is between force applying and driving means shown as wheels 57 and 58. Wheels 57 and 58 are fixed at the upper ends of spindles 59 and 60 rotatable in a carrier 62. Carrier 62 is pivotally supported on spindle 64 fixed in support 65 on base 10. An actuating arm 67 extends downwardly at one side of carrier 62 between opposed bellows 68 and 69. Air under pressure is alternatively supplied through a system later described to bellows 68 and 69 to move arm 67, swing carrier 62, and alternatively apply wheels 57 and 58 to the outer bearing race. Because wheels 57 and 58 engage the race at diametrically opposite points the play between the races is first taken up in one direction and then in the reverse direction.

A race driving motor 204 mounted in base 10 drives through a variable speed transmission 72 of a commercially available type and a flexible shaft 74 connected through spindle 59 to drive wheel 57. An elastic or spring belt 75 extends between pulley 76 at the lower end of spindle 59 and pulley 77 at the lower end of spindle 60, driving wheel 58 in the same direction as wheel 57. Thus as the wheels are alternatively applied to the bearing race to reverse the forces thereon the race is simultaneously rotated by the applied wheels to simulate operating conditions as the gaging of radial play takes place.

Spindle 60 is rotatable within a support 78 slidable along carrier 62 relative to spindle 59. Threaded member 80 coupled to support 78 moves the support as knurled nut 81 is rotated and support 78 is clamped in position by lock nut 82. This allows a flexible adjustment of the spacing between the force applying and race driving wheels 57 and 58 for different applications. Because belt 75 is elastic or spring-like it can expand or contract to accommodate the adjustment.

Wheel 57 has an annular groove in its periphery to accommodate the outer end of feeler arm 41 which engages the outer race and follows its movement as the play is taken up in one direction and reversed. Arm 41 is pivotally supported on base 10 by a flexible leaf 85. As one end of arm 41 engages the outer race the end at the other side of the pivot support engages the movable work contactor 86 of a precision air leakage cartridge 87 having an air leakage orifice controlled by work contactor movement.

Figures 9 and 10 diagrammatically illustrate the action during gaging. In both instances clamp member 44 is urged downwardly and wedged into the bore of the inner bearing race in opposition to clamp button 40. In Figure 9 wheel 57 is driven and forced against one side of the outer bearing race, moving it to the right, and taking up the play in that direction. Feeler arm 41 within the groove of wheel 58 follows this movement. Wheel 57 at this time is retracted at the right. When carrier 62 is swung in the opposite direction by expansion of bellows 69, wheel 57 is retracted and wheel 58 engages the opposite side of the outer race to reverse the direction of force application and take up the radial play in the opposite direction. Feeler 41 again follows this movement and the displacement of feeler 41 between the positions of Figures 9 and 10 is determined by the radial play of the bearing. The outer race is continuously driven in the same direction during both force applications.

The left hand portion of the air diagram of Figure 8 illustrates the gaging circuit. Air is supplied to both the gaging and actuating portions of the system from a common source of air under pressure indicated at 90. The flow path to cartridge 87 from source 90 includes a regulator 91, a pressure gage 92, a restriction 94, an expansible chamber 95, and a flexible conduit 96 connected to the end of the cartridge. Actuation of work contactor 86 in response to movements of feeler arm 41 will vary the leakage to atmosphere through the outlet orifice of the cartridge and will result in corresponding pressure variations downstream of restriction 94 and in chamber 95. One wall of chamber 95 is provided by a flexible diaphragm 98 in opposition to an open orifice 99 in an amplifying and switch actuating circuit. Regulator 100 controls the pressure supplied to this circuit as indicated by gage 102. The flow is through adjustable restrictor 104, past gage 105 and to orifice 99. Pressure downstream of restriction 104 will be determined by the leakage through orifice 99 which is controlled in an amplified sense by diaphragm 98 in response to gaging pressures obtained in chamber 95. Diaphragm 98, chamber 95 and orifice 99 form parts of an amplifying capsule 106 which can be of any suitable design. For example, a unit which can be employed is illustrated and described in more detail in Patent No. 2,706,397 issued April 19, 1955.

A variation head 221 which can be of a construction similar to that disclosed in patent application No. 437,680 filed June 18, 1954 is connected to respond to the pressures obtained in the circuit downstream of restriction 104. It includes sets of switch contacts 222 and 223 which can be adjusted to be actuated at predetermined variations in the system pressure. The greater the relative play between the inner and outer bearing races, the greater will be the pressure variation encountered in each gaging cycle. In this example if the radial play is smaller than the minimum required, both sets of contacts 222 and 223 remain closed. If the radial play and pressure variation is in the allowable zone, contacts 223 open and contacts 222 remain closed. At the maximum radial play and conditions above this limit both sets of contacts are open. These switch conditions are indicated in the chart of Figure 12.

After a gaging signal and switch actuation are obtained the pressure in the circuit to variation head 221 must be relieved in order to reset the head. For this reason a valve 108 connected to a branch passage of the circuit is automatically actuated by solenoid 232 included in an electrical circuit later described to relieve this pressure and reset the head.

Abutment 46 is extended or retracted to operate clamp 44 when valve 109 is actuated in one direction or the other by solenoids 210 and 230. Air is supplied for the clamping through a regulator 110. Valve 111 controlled by solenoids 218 and 220 meters air under pressure to one or the other of force applying bellows 68 and 69. An extremely flexible and precise control of the force applied to the outer race is provided by adjustable regulators 112 and 114 connected respectively in the passages leading to bellows 68 and 69. Flow control valves 115 and 116 allow free return from the associated bellows but check flow in the opposite direction. Gages 117 and 118 aid in the pressure adjustment. Through this system precisely equal force applications can be readily obtained or applications of any desired amount in either direction can be utilized as necessary.

After gaging, when transfer plate 20 is advanced, the previously gaged bearing is moved to a position over reject trap door 120 forming a portion of the floor of chute 24. If the bearing is above or below tolerances, solenoid 240 is energized to retract trap door 120 against the tension of return spring 121 and the bearing drops from the chute. A segregating gate 125 is swung in one direction when solenoid 241 is energized to divert bearing assemblies having below minimum radial play into inclined segregating chute 127. If the radial play is above that allowable gate 125 swings to its other position and the bearing is diverted into segregating chute 126. If a bearing is in the satisfactory or "O. K." range trap door 120 is not retracted and the bearing is subsequently moved from the trap door and further along chute 24 when the next bearing is transferred from gaging station 25 onto the trap door. The operation and mechanism of the segregating mechanism just described are conventional and form no important portion of the present invention.

Thus it is seen that a bearing assembly is moved automatically into position within a gaging station, its radial play rapidly and accurately gaged as the bearing components are driven to simulate operating conditions, and the bearing is then automatically carried to a segregating mechanism controlled in accordance with the gaging results.

All signals of positions of apparatus components are provided by the switches previously described and actuation of these same components is by means of the air cylinders and solenoids referred to. In the electrical circuit of Figure 11 a number of switches and solenoids employed in the operation of the transfer and selection or segregation portions of the apparatus have been omitted for simplicity. These mechanisms are operated in a conventional manner. For completeness of disclosure, however, that portion of the electrical circuit related directly to gaging and providing the gaging signals has been shown in Figure 11 and will now be described.

The initial conditions assumed are that a bearing is in gaging position, crossfeed or transfer plate 20 is in its returned position as in Figure 1, the feed fingers are down into chute 24, and clamp 44 is retracted. With these conditions the switch contacts of the electrical circuit are as illustrated.

Power is supplied to the circuit by closing switch 200. Depressing switch 202 completes the circuit to motor control relay 203 which in turn closes holding contacts 203a and also closes contacts 203b to race rotation motor 204 and conveyer belt motor 205. Relay 203 also closes switch 203c to the remainder of the circuit. Closing of switch 203c energizes solenoid 220 to supply air under precisely controlled pressure to bellows 69, swinging carrier 62 and applying driven wheel 78 to the outer bearing race. Gaging relays 224 and 225 are also energized, closing contacts 224a and 225a. Manually operated switch 201 serves to stop the motors and open contacts 203c to the remainder of the circuit. The gaging cycle is automatically repeated and is started when switch 207 is depressed to energize relay 208 and close switches 208a, b, c. Switch 206 serves as a cycle stop control. Contacts 208a close in a holding circuit around switch 207. Contacts 208b close to solenoid 210, energizing air cylinder 47, rocking bellcrank 45 and wedging clamp 44 into the inner race.

When clamp 44 moves downward switch 211 is actuated and closed. With the crossfeed returned contacts 231A are closed, energizing timer 212 of a commercially available type providing a predetermined delay before gaging to insure full engagement of clamp 44 and allow air in the gaging circuit to stabilize. After the predetermined delay timer 212 closes contacts 212a to energize relay 214. Relay 214 in turn closes contacts 214a and opens contacts 214b, c, d. Contacts 214b open to force applying solenoid 220 and contacts 214a energize timer 215 and solenoid 218 which reverses the force application.

The contacts of variation head 221 operate as previously described. If there is not sufficient radial play contacts 222 and 223 will be closed and energize both relays 224 and 225. If the bearing is satisfactory only relay 224 will be energized and if there is too much radial play neither relay will be energized. Relays 224 and 225 also control switches in a circuit portion not disclosed to obtain proper operation of trap door 120 and segregating gate 125 in a conventional manner.

Timer 215 after a predetermined delay to allow full rotation of the bearing actuates contacts 215a energizing relay 227 to close contacts 227a, b and hold the gaged signal obtained. Closing of contacts of 215a also energizes timer 228 which immediately closes contacts in a circuit portion not shown including latching relays controlled by gaging relays 224 and 225 to "read-out" the gaged condition. After a predetermined delay timer 228 closes contacts 228a to unclamp solenoid 230.

When clamp switch 211 opens to timer 212 and relay 214 that portion of the gaging is terminated and the next gaging cycle begins with a sequential transfer, gaging, and segregating.

Limit switch contacts 231B are open when crossfeed plate 20 returns. They are closed during advance and return and solenoid 232 is then energized to release the pressure in the gaging circuit to variation head 221 to automatically reset the head for the next gaging operation.

Thus it is seen that an apparatus has been provided for gaging critical conditions of an assembly under actual operating conditions. The apparatus is simple in operation and construction and is reliable for rapid, accurate, gaging operations through a long service life. It has advantages of adjustability for application to a wide range of part sizes. In the particular application disclosed the radial play of a bearing assembly is accurately determined as the bearing components are relatively rotated. The amount of force applied to the bearing can be readily and accurately adjusted.

What is claimed is:

1. Apparatus for gaging characteristics of a bearing or the like having relatively rotatable coaxial components comprising a base, means on said base for restraining one component, force applying means carried on said base providing surface means movable radially of the components for force application in reverse directions to the other component and tangentially of said other component at the location of force application for rotation thereof, actuating means connected to said force applying means for radial movement of said surface means and force application in reverse directions to said other component, gaging means for measuring the relative movement between the components under force application, and power means connected to said force applying means for driving said surface means tangentially during force application to relatively rotate the components during force application and during gaging.

2. Apparatus for gaging the radial play of an antifriction bearing assembly under simulated operating conditions comprising a base, a gaging station on said base, means in said station restraining the inner race against rotation and free radial movement during gaging, race rotation means at each side of the outer raceway for application to the periphery thereof, carrier means on said base supporting said rotation means for movement substantially diametrically of the assembly actuating means in said station connected to said carrier means for selective application of the rotation means to apply force to the outer race in reverse directions, said carrier means including means for adjusting the relative spacing between said rotation means for different size bearing assemblies, power means operatively connected to drive said rotation means for rotation of the outer race during force application, and gage means in said station responsive to movement of the outer race relative to the inner race under the reversed force applications and the radial play of the bearing assembly during rotation of the outer race relative to the inner.

3. Apparatus for gaging the radial play of an antifriction bearing assembly under simulated operating conditions comprising a base, a gaging station on said base, clamp means in said station for restraining the inner race against rotation and radial movement, race rotation means comprising drive wheels diametrally opposed at opposite sides of the outer raceway for application to the periphery thereof, a carrier for said wheels movable to carry the wheels substantially diametrally of a bearing to be gaged, actuating means in said station connected to said carrier for selective movement thereof in reverse directions to carry said drive wheels alternatively into engagement with the outer bearing race and apply reverse radial forces thereto, drive means operatively connected to said drive wheels for rotation thereof to rotate the outer race during force application, and gage means in said station responsive to movement of said outer race along the line of force application and the radial play of the bearing assembly during rotation of the outer race relative to the inner.

4. Apparatus as set forth in claim 3 wherein said clamp means comprises a stop surface for engagement with one face of the inner race and a tapered clamp member for insertion into wedge engagement with the inner race in opposition to the stop surface.

5. Apparatus as set forth in claim 3 wherein said drive means includes means interconnecting said wheels for simultaneous rotation in the same direction.

6. Apparatus as set forth in claim 3 wherein one of said drive wheels has an annular space in its periphery, said gage means including a gaging feeler for engagement with the periphery of the outer race within said space to follow outer race movement during reversal of force application and race rotation.

7. Apparatus for gaging radial play of an antifriction bearing assembly under simulated operating conditions comprising a base, a gaging station on said base, clamp means in said station restraining the inner race against rotation and radial movement, race rotation means comprising drive wheels diametrally opposed at opposite sides of the outer race for application to the periphery thereof, a carrier for said wheels movable to carry the wheels substantially diametrally of a bearing to be gaged, means mounting said wheels on said carrier including adjustment means for varying the relative axial spacing therebetween, actuating means in said station connected to said carrier for selective movement thereof in reverse directions to carry said drive wheels alternatively into engagement with the periphery of the outer race and apply reverse radial forces thereto, drive means operatively connected to both said drive wheels for rotation thereof to rotate the outer race during force application and gage means in said station responsive to movement of the outer race along the line of force application and the radial play of the bearing assembly during rotation of the outer race relative to the inner.

8. An apparatus as set forth in claim 7 wherein said wheel mounting means comprises means fixedly mounting one of said wheels on said carrier, a slide supporting the other wheel on said carrier and screw adjustment means cooperating between said slide and carrier for determining the relative spacing between the wheels, drive means connected to the fixedly mounted wheel and a resilient belt cooperating between the wheels for interdrive therebetween in all adjusted positions.

9. Apparatus for gaging radial play of an antifriction bearing assembly under simulated operating conditions comprising a base, a gaging station on said base, clamp means in said station for restraining the inner race against rotation and radial movement, race rotation means at opposite side of the outer raceway for application to the periphery thereof, carrier means for said rotation means movable substantially diametrally of a bearing to be gaged, actuating means in said station connected to said carrier means including air operated means for selective movement of the carrier means to apply reverse radial forces to the gaged bearing, regulator means adapted for connection to a source of air under pressure and to said air operated means whereby the magnitude of force application can be readily adjusted, drive means operatively connected to said rotation means to rotate the outer race during force application, and gage means in said station responsive to relative movement of the races along the line of force application and the radial play of the bearing assembly during rotation of the outer race relative to the inner.

10. Apparatus for gaging radial play of an antifriction bearing assembly under simulated operating conditions comprising a base, a gaging station on said base, clamp means in said station for restraining the inner race against rotation and radial movement, race rotation means comprising drive wheels diametrally opposed at opposite sides of the outer raceway for application to the periphery thereof, a carrier for said wheels movable substantially diametrally of a bearing to be gaged, actuating means in said station connected to said carrier including air operated means for selective movement of the carrier in reverse directions to apply reverse radial forces to the gaged bearing, regulator means adapted for connection to a source of air under pressure and to said air operated means whereby the magnitude of force application can be readily adjusted, drive means operatively connected to said drive wheels for rotation thereof to rotate the outer race during force application, and gage means in said station responsive to movement of said outer race along the line of force application and the radial play of the bearing assembly during rotation of the outer race relative to the inner.

11. Apparatus as set forth in claim 10 wherein said air actuating means includes opposed expansible chamber means operatively connected to said carrier, regulator means adapted for connection to a source of air under pressure, and conduit means between said regulator means and said expansible chambers including valve means for selectively applying the regulated pressure to the expansible chamber means.

12. Apparatus for gaging radial play of an antifriction bearing assembly under simulated operating conditions comprising a base, a gaging station on said base, clamp means in said station for restraining the inner race against rotation and radial movement, race rotation means at opposite sides of the outer raceway for application to the periphery thereof, a carrier for said race rotation means, means pivotally mounting said carrier for movement of said rotation means along a line substantially diametral to a bearing to be gaged, actuating means in said station connected to pivot said carrier about its pivot axis for selective application of the race rotation means to the outer race periphery for reverse force application thereto, drive means operatively connected to said race rotation means for rotation of the race during gaging, and gaging means in said station responsive to movement of the outer race along the line of force application and the radial play of the bearing assembly during rotation of the outer race relative to the inner.

13. Apparatus for gaging radial play of an antifriction bearing assembly under simulated operating conditions comprising a base, a gaging station on said base, clamp means in said station for restraining the inner race against rotation and radial movement, race rotation means comprising drive wheels diametrally opposed at opposite sides of the outer raceway for rotation about axes parallel to the bearing axis and for application to the periphery of the outer race, a carrier for said wheels, means pivotally mounting said carrier in said station for movement of said wheels along a line substantially diametral to the bearing to be gaged, air operated actuating means connected to said carrier for selective pivoting thereof in reverse directions for reverse force applications to the outer bearing race, drive means operatively connected to said drive wheels for rotation thereof to rotate the outer race during force application, one of said wheels having an annular groove in its periphery, and gage means in said station including a gaging feeler for engaging the outer race within said groove to follow movement of the outer race along the line of force reversal for measurement of the radial play of the bearing assembly during rotation of the outer race relative to the inner.

14. Apparatus for gaging the radial play of an antifriction bearing assembly comprising a base, a gaging station on said base, clamp means in said station for restraining the inner race against rotation and free radial movement while leaving the outer race radially and rotationally free, race rotation means comprising drive means having driving surfaces for application to diametrically opposite sides of the outer race, carrying means on said base for said drive means, actuating means in said station connected to said carrying means for alternative movement of said drive means toward the assembly axis from opposite directions for application of said driving surfaces to opposite sides of the outer bearing race to apply reverse radial forces thereto, power means operatively connected to said drive means to move said driving surfaces tangentially of the outer race while in force applying engagement therewith to rotate the outer race during force application, and gage means in said station responsive to movement of said outer race relative to the inner race along the line of force application and the radial play of the bearing assembly during rotation of the outer race relative to the inner.

15. Apparatus for automatically gaging the radial play of an antifriction bearing assembly comprising a base, a gaging station on said base, transfer means on said base for moving assemblies to and from a gaging position in said station, drive means at said station including force applying surface means for application to relatively rotate the inner and outer bearing races during gaging between transfer movements, actuating means connected to move said drive means radially of the assembly for alternatively applying diametral forces between the races in opposite directions, gaging means in said station responsive to the relative movement between the bearing races along the line of force application under the applied forces, power means connected to said drive means to drive said force applying means transverse the direction of force application at the location of force application, and control means operatively connected to said transfer means and said gaging station providing automatic operation to sequentially position an assembly in gaging position, gage its radial play, and remove the assembly from the gaging station after gaging.

References Cited in the file of this patent

UNITED STATES PATENTS

| | | |
|---|---|---|
| 1,062,566 | Gohlke | May 20, 1913 |
| 1,491,050 | Lutz | Apr. 22, 1924 |
| 2,419,280 | Neff | Apr. 22, 1947 |
| 2,525,068 | Ericson | Oct. 10, 1950 |
| 2,636,379 | Van Dorn | Apr. 28, 1953 |
| 2,659,157 | Aller | Nov. 17, 1953 |
| 2,677,269 | Aller | May 4, 1954 |
| 2,700,889 | Young | Feb. 1, 1955 |
| 2,746,159 | Aller | May 22, 1956 |
| 2,761,560 | Pomernacki | Sept. 4, 1956 |